United States Patent
Cho et al.

(10) Patent No.: US 8,195,123 B2
(45) Date of Patent: Jun. 5, 2012

(54) CALL ORIGINATION METHOD FOR FULL-TOUCH SCREEN PORTABLE TERMINAL

(75) Inventors: Hyoung-Rae Cho, Daegu (KR); Jae-Gon Son, Suwon-si (KR); Hong-Seok Kwon, Daegu (KR); Dae-Gyue Park, Daegu (KR)

(73) Assignee: Samsung Electronics Co., Ltd, Suwon-si (KR)

(*) Notice: Subject to any disclaimer, the term of this patent is extended or adjusted under 35 U.S.C. 154(b) by 233 days.

(21) Appl. No.: 12/625,928

(22) Filed: Nov. 25, 2009

(65) Prior Publication Data
US 2010/0136946 A1    Jun. 3, 2010

(30) Foreign Application Priority Data
Nov. 28, 2008  (KR) .................. 10-2008-0119598

(51) Int. Cl.
*H04M 11/04* (2006.01)

(52) U.S. Cl. .......... 455/404.2; 455/466; 455/412.1; 345/173; 345/156

(58) Field of Classification Search .......... 455/466, 455/404.2, 412.1, 456.1; 345/173, 156
See application file for complete search history.

(56) References Cited

U.S. PATENT DOCUMENTS

| | | | |
|---|---|---|---|
| 4,715,063 A * | 12/1987 | Haddad et al. | 379/390.01 |
| 5,325,156 A * | 6/1994 | Ulinski | 399/8 |
| 6,518,889 B2 * | 2/2003 | Schlager et al. | 340/573.1 |
| 2009/0192815 A1 * | 7/2009 | Canada | 705/1 |

* cited by examiner

*Primary Examiner* — Kamran Afshar
*Assistant Examiner* — Manpreet Matharu
(74) *Attorney, Agent, or Firm* — Jefferson IP Law, LLP

(57) ABSTRACT

An apparatus and method for originating a call in a full-touch screen portable terminal are provided. In the method, it is determined whether a malfunction occurs. An emergency call mode is executed in the event of the malfunction. It is determined whether an event is generated in the emergency call mode. If the event is generated, a phone number corresponding to the generated event is retrieved to originate a call.

12 Claims, 3 Drawing Sheets

CALL ORIGINATION METHOD FOR FULL-TOUCH SCREEN PORTABLE TERMINAL

PRIORITY

This application claims the benefit under 35 U.S.C. §119 (a) of a Korean patent application filed in the Korean Intellectual Property Office on Nov. 28, 2008 and assigned Serial No. 10-2008-0119598, the entire disclosure of which is hereby incorporated by reference.

BACKGROUND OF THE INVENTION

1. Field of the Invention

The present invention relates to an apparatus and method for originating a call in a full-touch screen portable terminal. More particularly, the present invention relates to an apparatus and method for originating a call even in the event of a malfunction of a full-touch screen portable terminal.

2. Description of the Related Art

Recently, portable terminals are evolving into multimedia devices capable of providing various additional functions such as an electronic organizer function, a game function, and a schedule management function. Thus, user interfaces are necessary to more conveniently manage and use the various additional functions of a portable terminal. Accordingly, various methods are being proposed for users to more conveniently use the various additional functions, and a touchscreen-based method is being especially popular among them. When a user touches a touchscreen with a finger or a stylus pen, a portable terminal detects the touch point to execute a corresponding command or move a cursor position. A touchscreen operates according to various principles. Examples of the operational principles of the touchscreen include a pressure detection-based method of responding to a pressure applied to a screen surface, an electrostatic method of detecting a touch point by sensing a lost charge, and an infrared method of detecting a touch point by sensing the interruption of an infrared ray.

With development of communication technologies, communication networks have evolved by implementing $3^{rd}$ Generation (3G) technologies and the expansion of 3G services have introduced a full browsing wireless Internet capability. The use of a touchscreen suitable for implementation of the full browsing wireless Internet capability has enabled the implementation of a user-friendly user interface. More particularly, as a full-touch screen mode where a touchscreen is applied to an entire screen have become popular, an entire side of a portable terminal has been used for a display screen and the display screen size has increased, which has enabled the convenient use of an Internet browsing service in the portable terminal. A portable terminal using a touchscreen may have a display screen size of 3.0 to 3.5 inches, which is 1 inch greater than that of a conventional portable terminal.

However, because the full-touch screen portable terminal does not have a number or character keypad, it cannot originate a call to a desired phone number if the touchscreen malfunctions.

SUMMARY OF THE INVENTION

An aspect of the present invention is to address at least the above-mentioned problems and/or disadvantages and to provide at least the advantages described below. Accordingly, an aspect of the present invention is to provide a call origination method for a full-touch screen portable terminal.

In accordance with an aspect of the present invention, a call origination method for a full-touch screen portable terminal is provided. The method includes determining whether a malfunction occurs, executing an emergency call mode in the event of the malfunction, determining whether an event is generated in the emergency call mode, and if it is determined that the event is generated, retrieving a phone number corresponding to the generated event to originate a call.

In accordance with an aspect of the present invention, an apparatus for originating a call for a full-touch screen portable terminal is provided. The apparatus comprises a touchscreen for displaying, and a controller which comprises a malfunction detection module for detecting a malfunction of the touchscreen, a motion detection module for detecting a movement/motion of the full-touch screen portable terminal when the malfunction of the touchscreen is detected by the malfunction detection module and for determining whether an event is generated in an emergency call mode, a voice detection module for detecting a user's voice input through a microphone when the malfunction of the touchscreen is detected by the malfunction detection module and for determining whether an event is generated in an emergency call mode, wherein, if it is determined that the event is generated in the emergency call mode, the controller retrieves a phone number corresponding to the generated event to originate a call.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the convenience of description, a mobile communication terminal is exemplified as a full-touch screen portable terminal according to exemplary embodiments of the present invention, to which the present invention is not limited. The full-touch screen portable terminal may be any terminal that has a full-touch screen unit. It should be clearly understood that the present invention is applicable to any information communication devices, any multimedia devices, and applications thereof, examples of which include mobile communication terminals, mobile phones, Personal Digital Assistant (PDA) terminals, smart phones, International Mobile Telecommunication (IMT)-2000 terminals, Code Division Multiple Access (CDMA) terminals, Wideband Code Division Multiple Access (WCDMA) terminals, Global System for Mobile telecommunication (GSM) terminals, and digital broadcasting terminals.

Figure 1:
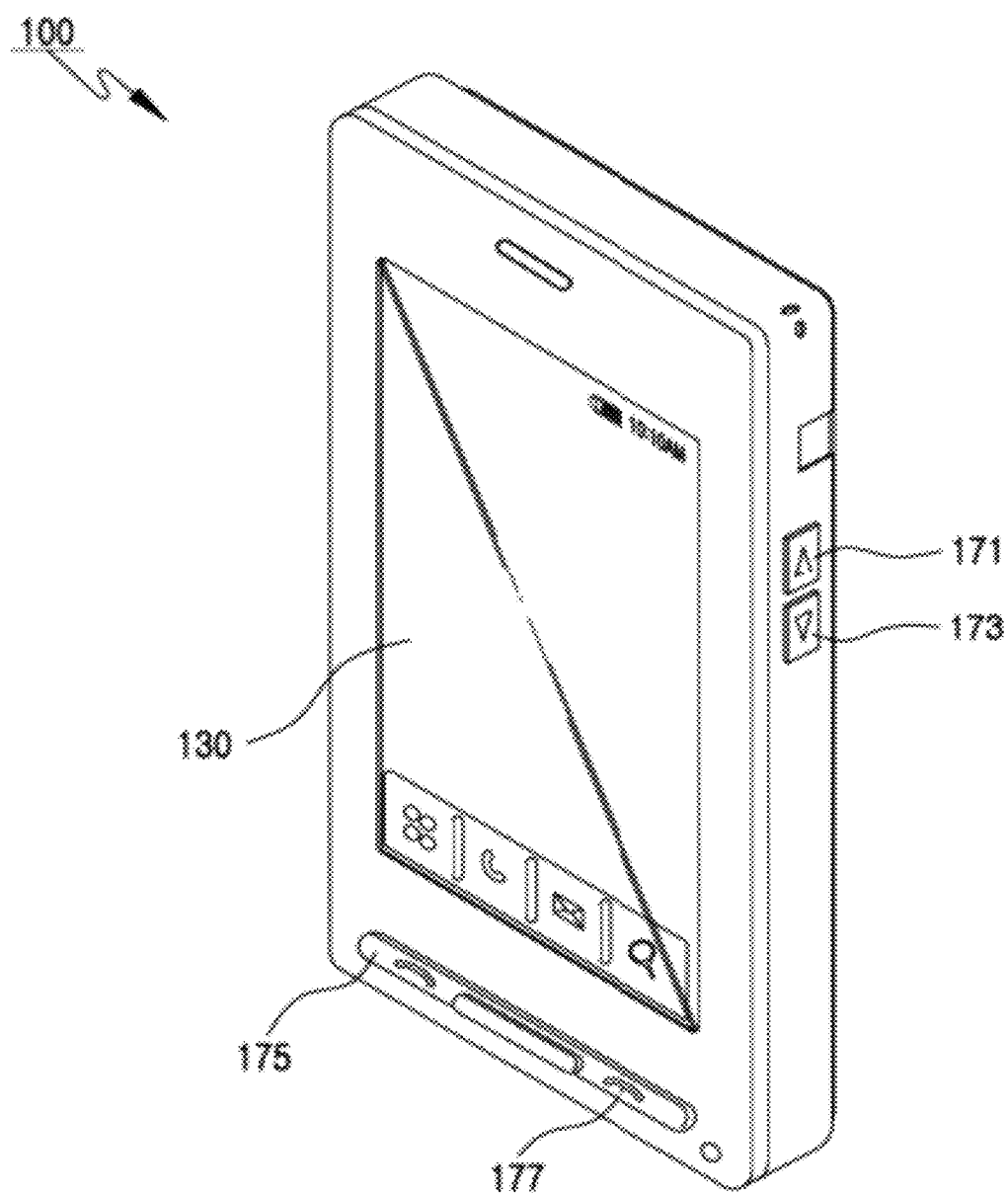
FIG. 1 a perspective view of a full-touch screen portable terminal according to an exemplary embodiment of the present invention.

FIG. 1 a perspective view of a full-touch screen portable terminal according to an exemplary embodiment of the present invention.

Referring to FIG. 1, a body forming the external appearance of a full-touch screen portable terminal 100 according to an exemplary embodiment of the present invention may have a rectangular parallelepiped shape. Assuming that the front side is a side of the full-touch screen portable terminal 100 at which a display unit 130 is located, a VOLUME UP key 171 and a VOLUME DOWN key 173 may be located on the right or left side of the body and a CALL key 175 and a POWER key 177 may be located on the front side of the body. Although FIG. 1 illustrates that the VOLUME UP key 171, the VOLUME DOWN key 173, the CALL key 175, and the POWER key 177 are located at certain points of the body, the present invention is not limited thereto. That is, the VOLUME UP key 171, the VOLUME DOWN key 173, the CALL key 175, and the POWER key 177 may be located at various points of the full-touch screen portable terminal 100, and some of them may be omitted depending on the designer's intentions.

The external appearance of the full-touch screen portable terminal 100 according to an exemplary embodiment of the present invention has been described above. The configuration of the full-touch screen portable terminal 100 according to an exemplary embodiment of the present invention will be described below.

Figure 2:
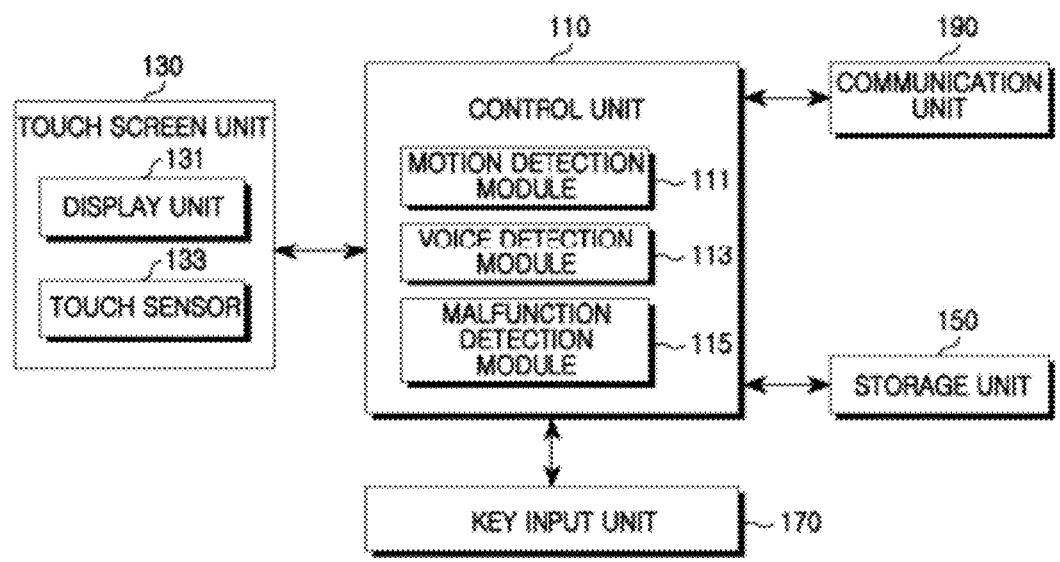
FIG. 2 is a block diagram of a full-touch screen portable terminal according to an exemplary embodiment of the present invention.

FIG. 2 is a block diagram of the full-touch screen portable terminal 100 according to an exemplary embodiment of the present invention.

Referring to FIG. 2, the full-touch screen portable terminal 100 may include a control unit 110, a touchscreen unit 130, a storage unit 150, a key input unit 170, and a communication unit 190.

The control unit 110 may include a motion detection module 111, a voice detection module 113, and a malfunction detection module 115. The control unit 110 may control overall operations of the full-touch screen portable terminal 100 and a signal flow between internal blocks, and may perform a data processing operation. The control unit 110 may perform a call origination operation through motion detection and voice detection because it may include the motion detection module 111 and the voice detection module 113. The motion detection module 111 may detect the movement/motion of the full-touch screen portable terminal 100 by using a motion detection output value of a motion sensor. Examples of the movement/motion include a clockwise/counterclockwise rotational motion and an up/down/right/left linear motion. The voice detection module 113 detects a user's voice input through a microphone. When detecting a voice of a specific level or more, the voice detection module 113 detects specific data contained in the voice, i.e., an event in an exemplary embodiment of the present invention. Details of the motion detection module 111 and the voice detection module 113 are well known to those skilled in the art, and thus their description will be omitted for conciseness. The malfunction detection module 115 may detect a malfunction of the full-touch screen portable terminal 100. According to an exemplary embodiment of the present invention, the malfunction of the full-touch screen portable terminal 100 may be a malfunction of the touchscreen unit 130. For example, not only if a display unit of the touchscreen unit 130 does not operate due to breakage or other reasons, but also if a value input to a touch sensor of the touchscreen unit 130 deviates from the correct range, the malfunction detection module 115 may determine that the full-touch screen portable terminal 100 malfunctions. Also, if a malfunction detection notification is input through the key input unit 170, the malfunction detection module 115 may determine that the full-touch screen portable terminal 100 malfunctions.

The touchscreen unit 130 includes a display unit 131 and a touch sensor 133. The display unit 131 displays certain information related to a state and operation of the full-touch screen portable terminal 100, and displays user data output from the control unit 110. The display unit 131 may be implemented using a Liquid Crystal Display (LCD). The display unit 131 includes an LCD control unit, a memory storing display data, and an LCD display unit. The touch sensor 133 is installed at the display unit 131. The touch sensor 133 detects a touch generated at the display unit 131, to determine the coordinates of a region at which the touch is generated. The touch sensor 133 transmits the determined coordinates to the control unit 110, so that a function corresponding to the touch region can be performed. According to an exemplary embodiment of the present invention, the full-touch screen portable terminal 100 receives numbers or characters through the touch sensor 133 to select a menu for setting various functions. In an event of a malfunction of the touchscreen unit 130, the full-touch screen portable terminal 100 may fail to receive a number input through the touch sensor 133, or cannot originate a call due to a display screen error in the display unit 131.

The storage unit 150 stores various programs for controlling general operations of the full-touch screen portable terminal 100, phone numbers for call origination, and various data generated during the operation of the full-touch screen portable terminal 100. According to an exemplary embodiment of the present invention, the storage unit 150 stores at least one or more of a voice detection event, a motion detection event, a mapping event and a combination event of the key input unit 170, and the corresponding phone numbers. Table 1 below represents the phone numbers stored in the storage unit 150, in a table format.

TABLE 1

| | Event | Phone Number |
|---|---|---|
| Key Input Combination | VOLUME UP Key + CALL Key | 010-0000-0000 |
| | VOLUME DOWN Key + CALL Key | 119 |
| | VOLUME UP Key + VOLUME DOWN Key + CALL Key | 112 |
| Key Input Mapping | VOLUME UP Key | 010-0000-0000 |
| | VOLUME DOWN Key | 119 |
| | CALL Key | 112 |
| Motion Detection | Shake Up/Down (↓ ↑) | 010-0000-0000 |
| | Shake Back/Forth (↙↗) | 119 |
| | Shake Left/Right (⇆) | 112 |
| Voice Detection | My Home | 010-0000-0000 |
| | Fire Station | 119 |
| | Police Station | 112 |

Referring to Table 1, a phone number table of the storage unit 150 stores a phone number corresponding to each event type. Thus, if a specific event occurs, the control unit 110 detects the event, retrieves the corresponding phone number, and transmits the corresponding call through the communication unit 190. The events and the phone numbers shown in Table 1 are merely exemplary and may vary depending on designer's intentions.

The key input unit 170 may include a plurality of function keys for setting various functions. Examples of the function keys include navigation keys, side keys, and shortcut keys that are set to perform specific functions. According to an exemplary embodiment of the present invention, the key input unit 170 includes a VOLUME UP key 171, a VOLUME DOWN key 173, a CALL key 175, and a POWER key 177.

The communication unit 190 performs a communication function of the full-touch screen portable terminal 100. The communication unit 190 may include a duplexer for dividing transmit/receive (RX/RX) functions, a TX unit for upconverting a TX signal, and an RX unit for downconverting an RX signal.

Figure 3:
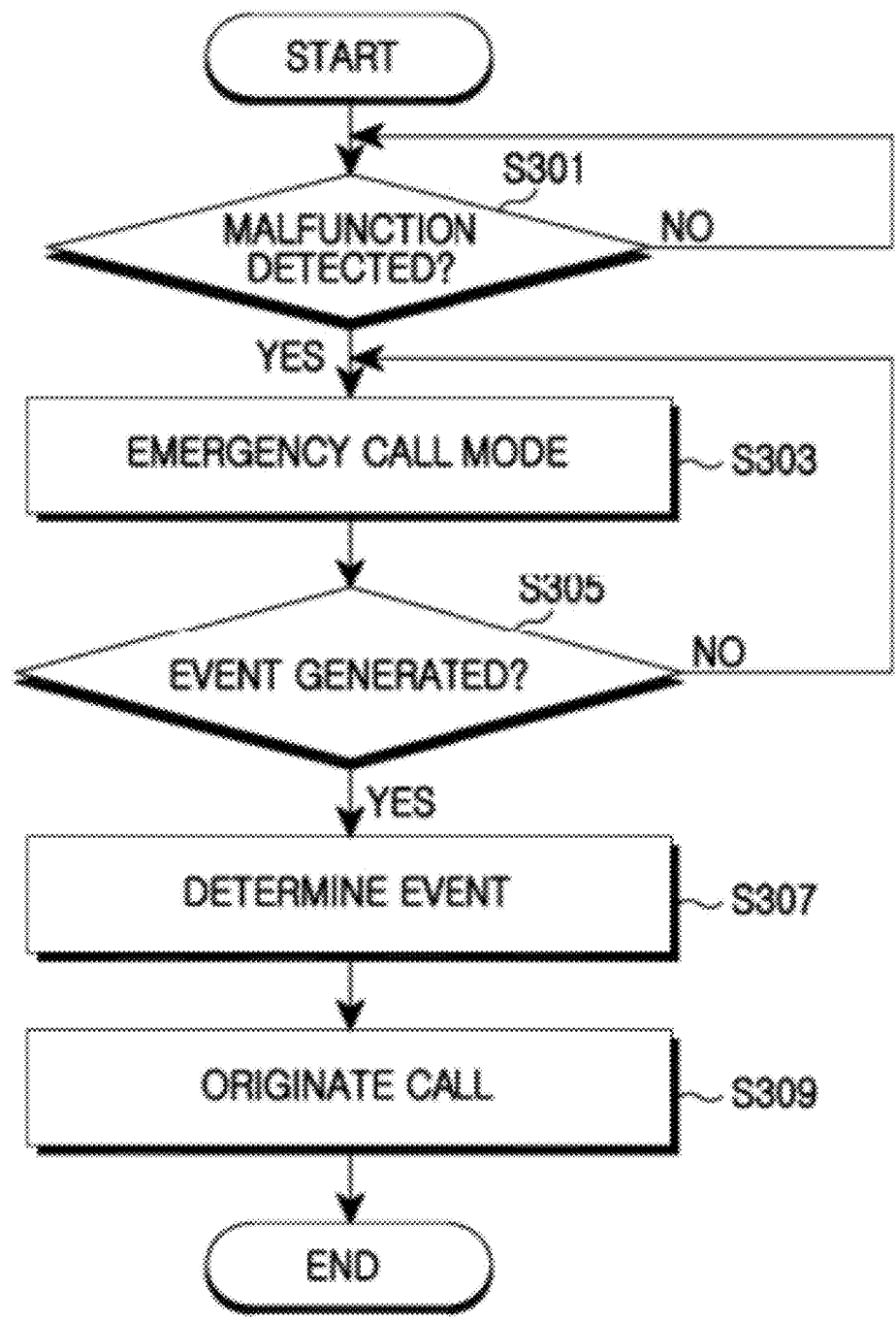
FIG. 3 is a flowchart illustrating a call origination process of a full-touch screen portable terminal according to an exemplary embodiment of the present invention.

FIG. 3 is a flowchart illustrating a call origination process of a full-touch screen portable terminal according to an exemplary embodiment of the present invention.

Referring to FIG. 3, in step S301, the full-touch screen portable terminal determines whether it malfunctions. The malfunction determination may be performed automatically through the check on the display unit 131 and the touch sensor 133 of the touchscreen unit 130 by the malfunction detection module 115 of the control unit 110. Also, if an input notifying a malfunction of the full-touch screen portable terminal is received through the key input unit 170, the malfunction detection module 115 may determine that the full-touch screen portable terminal malfunctions. For example, if a user detects a malfunction of one of the display unit 131 and the touch sensor 133, and simultaneously presses the CALL key 175 and the POWER key 177 of the key input unit 170, the malfunction detection module 115 may determine the input of the key input unit 170 as a malfunction. The malfunction notification input may be preset in the full-touch screen portable terminal, to which the present invention is not limited.

If it is determined that the full-touch screen portable terminal malfunctions in step S301, the full-touch screen portable terminal proceeds to step S303. The full-touch screen portable terminal executes an emergency call mode in step S303. The emergency call mode may be executed automatically in the event of a malfunction of the full-touch screen portable terminal In another exemplary embodiment, the emergency call mode may be executed when an input requesting the execution of an emergency call mode is received through the key input unit 170.

For execution of the emergency call mode, the full-touch screen portable terminal activates the motion detection module 111 or the voice detection module 13. If the full-touch screen portable terminal malfunctions by failing to receive a number input through the touch sensor 133 of the touchscreen unit 130, it executes an emergency call mode and simultaneously displays a screen notifying the emergency call mode in step S303. Also, if the full-touch screen portable terminal malfunctions due to an error in the display unit 131 of the touchscreen unit 130, it executes an emergency call mode and simultaneously outputs an alarm notifying the emergency call mode in step S303.

In step S305, the full-touch screen portable terminal detects an event generated in the full-touch screen portable terminal itself and determines whether the generated event is a preset event. The event includes not only an event generated through the key input unit 170 but also at least one of events generated through motion detection and voice detection according to an exemplary embodiment of the present invention. That is, the full-touch screen portable terminal detects an event generated in an emergency call mode and determines whether the detected event is an event set in the storage unit 150 of the full-touch screen portable terminal. The events set in the storage unit 150 are stored in the format of a phone number table that stores phone numbers corresponding to event types, as shown in Table 1. For example, if an event of sequentially pressing the VOLUME UP key 171 and the VOLUME DOWN key 173 is generated, the full-touch screen portable terminal determines the generated event as a set event with reference to Table 1 in step S305.

The events set in the storage unit 150 may be set directly by the touch sensor 133 before the malfunction of the full-touch screen portable terminal, which may be preset by the manufacturer of the full-touch screen portable terminal.

If it is determined that the generated event is a preset event in step S305, the full-touch screen portable terminal proceeds to step S307. In step S307, the full-touch screen portable terminal retrieves a phone number corresponding to the event. For example, if an event of sequentially pressing the VOLUME UP key 171 and the VOLUME DOWN key 173 is determined as a preset event in step S305, the full-touch screen portable terminal retrieves a phone number "010-0000-0000" corresponding to the event in step S307. Additionally, the full-touch screen portable terminal may output the phone number in a voice after retrieving the phone number.

In step S309, the full-touch screen portable terminal originates a call using the phone number retrieved in step S307. Thereafter, the full-touch screen portable terminal ends the call origination process according to an exemplary embodiment of the present invention.

As described above, exemplary embodiments of the present invention provide a call origination method for a full-touch screen portable terminal, thereby making it possible to originate a call in the event of a malfunction of the full-touch screen portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An emergency call origination method for a full-touch screen portable terminal, the method comprising:

determining whether a malfunction of a touch screen occurs;

executing an emergency call mode, if it is determined that the malfunction occurs;

determining whether an event is generated in the emergency call mode using at least one of determination of movement of the full-touch screen portable terminal and detection of a user's voice input;

if it is determined that the event is generated in the emergency call mode, retrieving, by the full touch screen portable terminal, a stored phone number corresponding to the generated event to originate an emergency call; and automatically originating the emergency call using the retrieved phone number.

2. The method of claim 1, wherein the determining whether the malfunction of a touch screen occurs comprises automatically determining whether the malfunction of a touch screen occurs by checking at least one of a display unit and a touch sensor of the full-touch screen portable terminal.

3. The method of claim 1, wherein the determining whether the malfunction of a touch screen occurs comprises determining that the full-touch screen portable terminal malfunctions, if an input notifying a malfunction of at least one of a display unit and a touch sensor is received through a key input unit of the full-touch screen portable terminal.

4. The method of claim 1, wherein the executing of the emergency call mode comprises entering into the emergency call mode automatically if it is determined that the malfunction of a touch screen occurs.

5. The method of claim 1, wherein the malfunction comprises at least one of a failure to receive a number input through a touch sensor and a failure due to an error in a display unit of a touchscreen unit.

6. The method of claim 1, wherein the executing of the emergency call mode comprises outputting at least one of a display and an alarm for notifying the emergency call mode of the full-touch screen portable terminal.

7. The method of claim 6, wherein the executing of the emergency call mode comprises activating at least one of a motion detection module and a voice detection module of the full-touch screen portable terminal.

8. The method of claim 7, wherein the event includes at least one of a voice detection event, a motion detection event, a mapping event, and a combination event of a key input unit.

9. The method of claim 8, wherein the determining whether the event is generated in the emergency call mode comprises:

determining whether the event is defined in a storage unit of the full-touch screen portable terminal; and determining that the event is generated, if it is determined that the event is defined in the storage unit.

10. The method of claim 9, further comprising outputting the retrieved phone number to a speaker.

11. An apparatus for originating an emergency call for a full-touch screen portable terminal, the apparatus comprising:

a touchscreen; and a controller comprising:

a malfunction detection module for detecting a malfunction of the touchscreen;

a motion detection module for detecting movement of the full-touch screen portable terminal when the malfunction of the touchscreen is detected by the malfunction detection module and for determining whether an event is generated in an emergency call mode; and a voice detection module for detecting a user's voice input through a microphone when the malfunction of the touchscreen is detected by the malfunction detection module and for determining whether an event is generated in an emergency call mode, wherein, if it is determined that the event is generated in the emergency call mode, the controller retrieves a stored phone number corresponding to the generated event to originate an emergency call and originates the emergency call using the retrieved phone number.

12. The apparatus of claim 11, further comprising:

a storage unit for storing at least one of a voice detection event, a motion detection event, a mapping event, and a combination event of a key input unit, and the corresponding phone numbers.

* * * * *